United States Patent
Willson et al.

(10) Patent No.: US 10,095,684 B2
(45) Date of Patent: Oct. 9, 2018

(54) TRAINED DATA INPUT SYSTEM

(71) Applicant: Microsoft Technology Licensing, LLC, Redmond, WA (US)

(72) Inventors: Matthew James Willson, London (GB); Douglas Alexander Harper Orr, Brentwood (GB); Juha Iso-Sipila, London (GB); Marco Fiscato, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/475,016

(22) Filed: Mar. 30, 2017

(65) Prior Publication Data
US 2018/0143965 A1   May 24, 2018

(30) Foreign Application Priority Data
Nov. 22, 2016  (GB) .................................. 1619724.6

(51) Int. Cl.
*G06F 17/27* (2006.01)
*G10L 25/30* (2013.01)

(52) U.S. Cl.
CPC ........ *G06F 17/276* (2013.01); *G06F 17/2785* (2013.01); *G10L 25/30* (2013.01)

(58) Field of Classification Search
CPC .............................. G06F 17/273; G06F 3/027
See application file for complete search history.

(56) References Cited

U.S. PATENT DOCUMENTS

| | | | |
|---|---|---|---|
| 4,782,464 A | 11/1988 | Gray et al. | |
| 4,783,761 A | 11/1988 | Gray et al. | |
| 5,572,423 A | 11/1996 | Church | |
| 8,498,864 B1 * | 7/2013 | Liang ...................... | G10L 15/22 369/25.01 |
| 9,703,394 B2 * | 7/2017 | Ouyang ................. | G06F 3/0237 |
| 9,760,559 B2 * | 9/2017 | Dolfing .................. | G06F 17/276 |
| 9,785,630 B2 * | 10/2017 | Willmore .............. | G06F 17/276 |
| 2011/0201387 A1 | 8/2011 | Paek et al. | |
| 2012/0246133 A1 | 9/2012 | Hsu et al. | |
| 2013/0253912 A1 * | 9/2013 | Medlock ............... | G06F 3/0237 704/9 |

(Continued)

FOREIGN PATENT DOCUMENTS

GB        2480649 A        11/2011

OTHER PUBLICATIONS

Bengio, Yoshua, et al. "A neural probabilistic language model." Journal of machine learning research (Feb. 3, 2003): 1137-1155. (Year: 2003).*

(Continued)

*Primary Examiner* — Brian L Albertalli
(74) *Attorney, Agent, or Firm* — Schwegman Lundberg & Woessner, P.A.

(57) ABSTRACT

A data input system has a processor which receives user input comprising a sequence of one or more items and a language model which computes candidate next items in the sequence using the user input. A training engine trains the language model using data about a plurality of true words which a user intended to input using the data input system, and for each true word, at least one alternative candidate, being a word computed assuming imperfect entry of the true word to the data input system.

20 Claims, 10 Drawing Sheets

(56) References Cited

U.S. PATENT DOCUMENTS

| | | | |
|---|---|---|---|
| 2013/0332822 A1* | 12/2013 | Willmore | G06F 17/273 715/257 |
| 2014/0201671 A1 | 7/2014 | Zhai et al. | |
| 2015/0095017 A1* | 4/2015 | Mnih | G06N 3/0454 704/9 |
| 2016/0247061 A1* | 8/2016 | Trask | G06N 3/04 |
| 2016/0275070 A1 | 9/2016 | Corston et al. | |
| 2018/0107642 A1* | 4/2018 | Gliozzo | G06F 17/273 |

OTHER PUBLICATIONS

Church, Kenneth W., and William A. Gale. "Probability scoring for spelling correction." Statistics and Computing 1.2 (1991): 93-103. (Year: 1991).*

Hodge, Victoria J., and Jim Austin. "A comparison of standard spell checking algorithms and a novel binary neural approach." IEEE transactions on knowledge and data engineering 15.5 (2003): 1073-1081. (Year: 2003).*

Lewis, David D., and William A. Gale. "A sequential algorithm for training text classifiers." Proceedings of the 17th annual international ACM SIGIR conference on Research and development in information retrieval. Springer-Verlag New York, Inc., 1994. (Year: 1994).*

Jurafsky, et al., "Spelling Correction and the Noisy Channel", https://web.stanford.edu/~jurafsky/slp3/6.pdf, Published on: Sep. 1, 2000, 14 pages.

Dyer, Chris, "Notes on Noise Contrastive Estimation and Negative Sampling", In Proceedings of Computing Research Repository, Oct. 2014, 4 pages.

Zoph, et al., "Simple, Fast Noise-Contrastive Estimation for Large RNN Vocabularies", In Proceedings of the North American Chapter of the Association for Computational Linguistics: Human Language Technologies, Jun. 12, 2016, 6 pages.

"15.2 Part 2—Quickly Finding Similar Soundslike", http://web.archive.org/web/20070223084804/http:/aspell.net/dev-html/Part-2-_002d-Quickly-Finding-Similar-Soundslike.html, Published on: Feb. 23, 2007, 2 pages.

Lhoussain, et al., "Adaptating the Levenshtein Distance to Contextual Spelling Correction", In International Journal of Computer Science and Applications, vol. 12, Issue 1, 2015, 127-133 pages.

Brill, et al., "An Improved Error Model for Noisy Channel Spelling Correction", In Proceedings of 38th Annual Meeting of the Association for Computational Linguistics, Oct. 1, 2000, 8 pages.

Ruder, Sebastian, "Softmax-based Approaches", http://sebastianruder.com/word-embeddings-softmax/, Published on: Jun. 13, 2016, 17 pages.

Yinwenpeng, "Hierarchical Softmax in neural network", https://yinwenpeng.wordpress.com/2013/09/26/hierarchical-softmax-in-neural-network-language-model/, Published on: Sep. 2013, 6 pages.

Zhang, et al., "Discriminative Reranking for Spelling Correction", In Proceedings of the 20st Pacific Asia Conference on Language, Information and Computation, Nov. 1, 2006, pp. 64-71.

Cucerzan, et al., "Spelling correction as an iterative process that exploits the collective knowledge of web users", In Proceedings of the Conference on Empirical Methods in Natural Language Processing, vol. 4, Jul. 25, 2004, 8 pages.

Vasilyev, Pavel, "Alternative approach to spell correction: character histograms", http://blog-archive.griddynamics.com/2014/04/alternative-approach-to-spell.html, Published on: Apr. 3, 2014, 5 pages.

Mnih, et al., "Fast and Simple Algorithm for Training Neural Probabilistic language Models", In Appearing in Proceedings of the 29th International Conference on Machine Learning, Edinburgh, Jun. 26, 2012, 8 pages.

Mnih, et al., "Learning word embeddings efficiently with noise-contrastive estimation", In Proceedings of 27th Annual conference on Neural Information Processing Systems, Dec. 5, 2013, 1-9 pages.

Chen, et al., "Recurrent Neural Network Language Model Training with Noise Contrastive Estimation for Speech Recognition", In Proceedings of 40th International Conference on Acoustics, Speech and Signal Processing, Apr. 19, 2015, 5 pages.

"Faster Recurrent Neural Network Language Modeling Toolkit with Noise Contrastive Estimation and Hierarchical Softmax", https://github.com/yandex/faster-rnnlm, Published on: Aug. 2015, 8 pages.

"Soundex", https://en.wikipedia.org/wiki/Soundex, Published on: Oct. 6, 2016, 3 pages.

"What is Candidate Sampling", https://www.tensorflow.org/extras/candidate_sampling.pdf, Retrieved on: Oct. 21, 2016, 9 pages.

"International Search Report and Written Opinion Issued in PCT Application No. PCT/US2017/059145", dated Mar. 1, 2018, 14 Pages.

* cited by examiner

TRAINED DATA INPUT SYSTEM

CROSS-REFERENCE TO RELATED APPLICATION(S)

This non-provisional utility application claims priority to GB patent application number 1619724.6 entitled "TRAINED DATA INPUT SYSTEM" and filed on Nov. 22, 2016, which is incorporated herein in its entirety by reference.

BACKGROUND

Data input systems such as virtual predictive keyboards enable a user to more easily enter data to an electronic device such as a smart phone, wearable computer, desktop computer or others. One or more candidate words or other text items are computed by the predictive technology as being potential candidates the user might want to enter next. One or more of the candidates are offered to the user so that he or she is able to input one of the candidates by making a single user input such as a single key press so as to save having to individually type in characters of a word, or having to scroll through lists of emoji or other text items. However, if the user cannot find the text item he or she wants in the offered candidates the user must proceed with selecting individual characters or scrolling lists of emoji. As the user enters individual letters of a word or makes scrolling actions to select emoji, the predictive technology may recompute (also referred to as re-rank) candidate predictions in the light of the additional data from the user. The re-ranked candidate predictions are then offered to the user for data input. This process of re-ranking the candidate predictions often repeats several times in cases where the user cannot find the text item he or she wants in the offered candidates.

The embodiments described below are not limited to implementations which solve any or all of the disadvantages of known data input systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A data input system has a processor which receives user input comprising a sequence of one or more items and a language model which computes candidate next items in the sequence using the user input. A training engine trains the language model using data about a plurality of true items which a user intended to input using the data input system, and for each true item, at least one alternative candidate, being an item computed assuming imperfect entry of the true item to the data input system Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
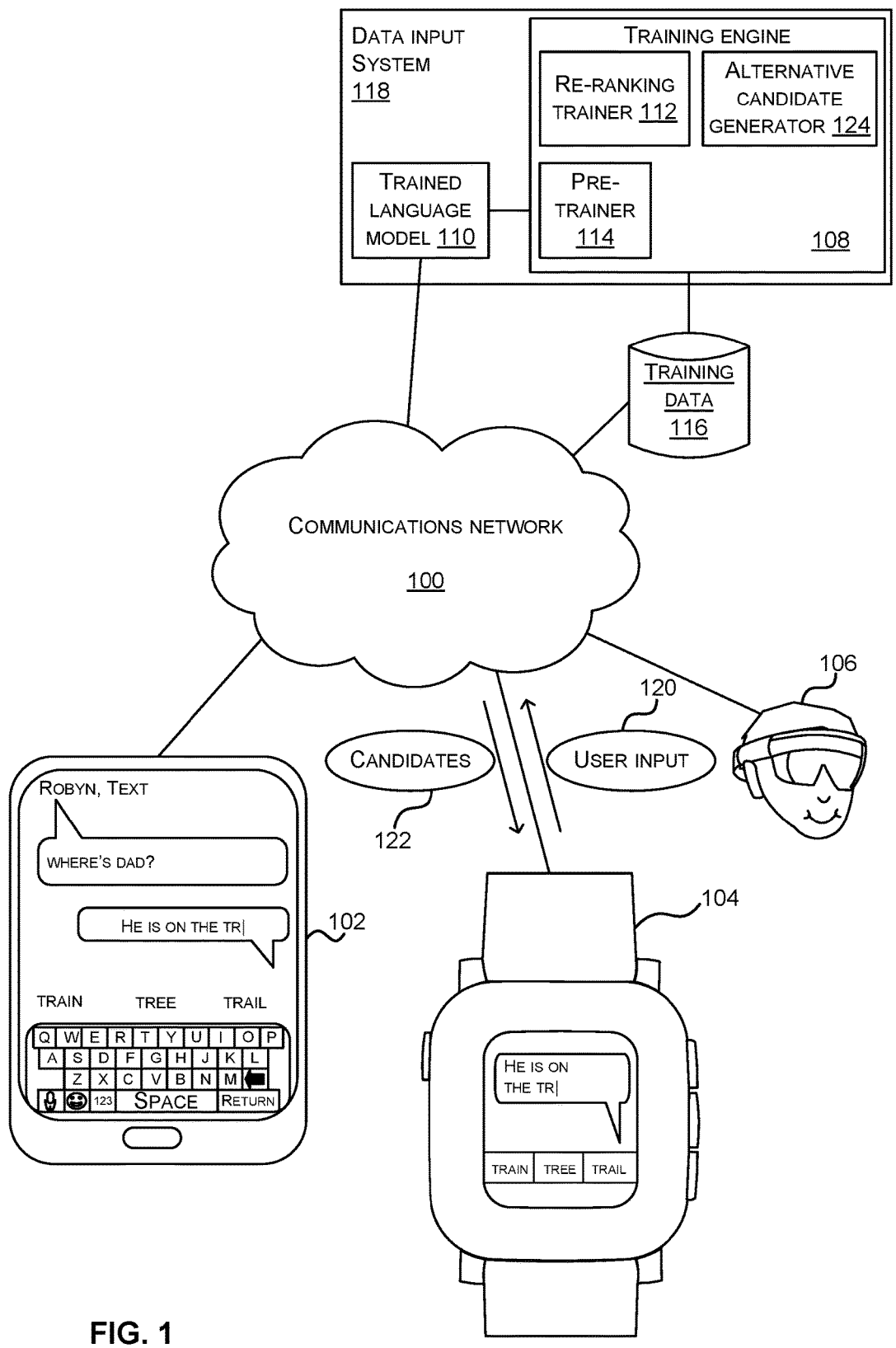
FIG. 1 is a schematic diagram of a data input system deployed in conjunction with a smart phone, a smart watch and an augmented-reality computing device.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

There is an ongoing need to improve the accuracy of predictions generated by virtual predictive keyboards and other predictive data input systems. It is recognized herein that information to aid the prediction is gained by considering imperfections in entry of the data by an end user. Imperfections arise for a variety of reasons including but not limited to: human error in the user input, noise introduced by sensors which detect the user input, corruption of data storing the user input, limitations of sensors used to detect user input, error in translation of sensor data to digital or other form for processing by the predictive technology. For example, a user may type a text item and make errors or omissions during typing of individual characters, such as by reversing letters, hitting an adjacent key to the one intended on the virtual keyboard, or speaking a word incorrectly. In some cases the input the user makes becomes corrupted and/or contains noise due to problems with sensors that detect the user input or problems with storage of the user input and converting the sensor data into digital form for processing. For example, the sensors may be microphones that detect speech which are calibrated for use in a quiet environment and later are used in a noisy room. For example, the sensors may be in a multi touch screen of an electronic device which has become less sensitive in a particular area of the screen.

In various examples a training engine trains a language model to predict next text items in a sequence of text items being input by a user. The training engine uses information about alternative candidates so as to improve the ability of the language model to discriminate between alternative candidates that arise as a result of imperfections in the user input. Given a particular text item, data about alternative candidates for that text item is computed by considering imperfections in user input made when a user wants to input the particular text item. The data about the alternative candidates is used to influence the training of the language model so that it is better able to discriminate between the particular text item and the alternative candidates. In this way accuracy of the language model is improved.

Various different types of language model 110 are used such as various different types of neural network language model 110 such as recurrent neural networks, maxent model neural networks (which have no hidden layers), convolutional neural networks, deep neural networks and others. The features of the neural network may be characters (such as in the case of a character recurrent neural network), words (such as in the case of a word recurrent neural network), or n-grams (such as in the case of a fixed-context neural network which may be a maxent model neural network).

FIG. 1 is a schematic diagram of a data input system 118 comprising a trained language model 110 and a training engine 108. The data input system 118 has access to training data 116. The data input system 118 trains a language model 110 using the training data 116 and the trained language model is then available to be downloaded (in whole or in part) to one or more electronic devices such as smart phone 102, smart watch 104 and augmented-reality computing device 106. Once trained, the language model 110 is used to predict one or more next items in a sequence of items input by a user. The items are language items such as text items or speech items and a non-exhaustive list of examples of an item is: word, morpheme, phrase, phoneme, emoji, emoticon, pictogram. The next items are offered as candidates to be input to an electronic device such as smart phone 102, smart watch 104 and augmented reality computing device 106. In some cases the trained language model 110 is available as a cloud service to one or more of the electronic devices 102, 104, 106. For example, smart watch 104 sends user input 120 it receives at a touch screen of the smart watch to the data input system 118. The trained language model 110 computes one or more predicted next items and these are sent as candidates 122 to the smart watch 104.

The language model 110 is trained using training engine 108 which has a re-ranking trainer 112 and optionally a pre-trainer 114. The training engine 108 also has an alternative candidate generator 124. The re-ranking trainer 112 trains the language model to discriminate between true items (items a user intends to input) and alternative candidates which are items computed assuming imperfect entry of the true item. The re-ranking trainer 112 uses data about alternative candidates generated by alternative candidate generator 124. The alternative candidates are generated by assuming imperfect entry of the true item as described in more detail with reference to FIG. 4. The pre-trainer 114 is optional and is used to speed up training of the language model 110 by using the pre-trainer 114 to train the language model 110 prior to using the re-ranking trainer 112. The pre-trainer does not use the output of the alternative candidate generator 124.

Figure 2A:
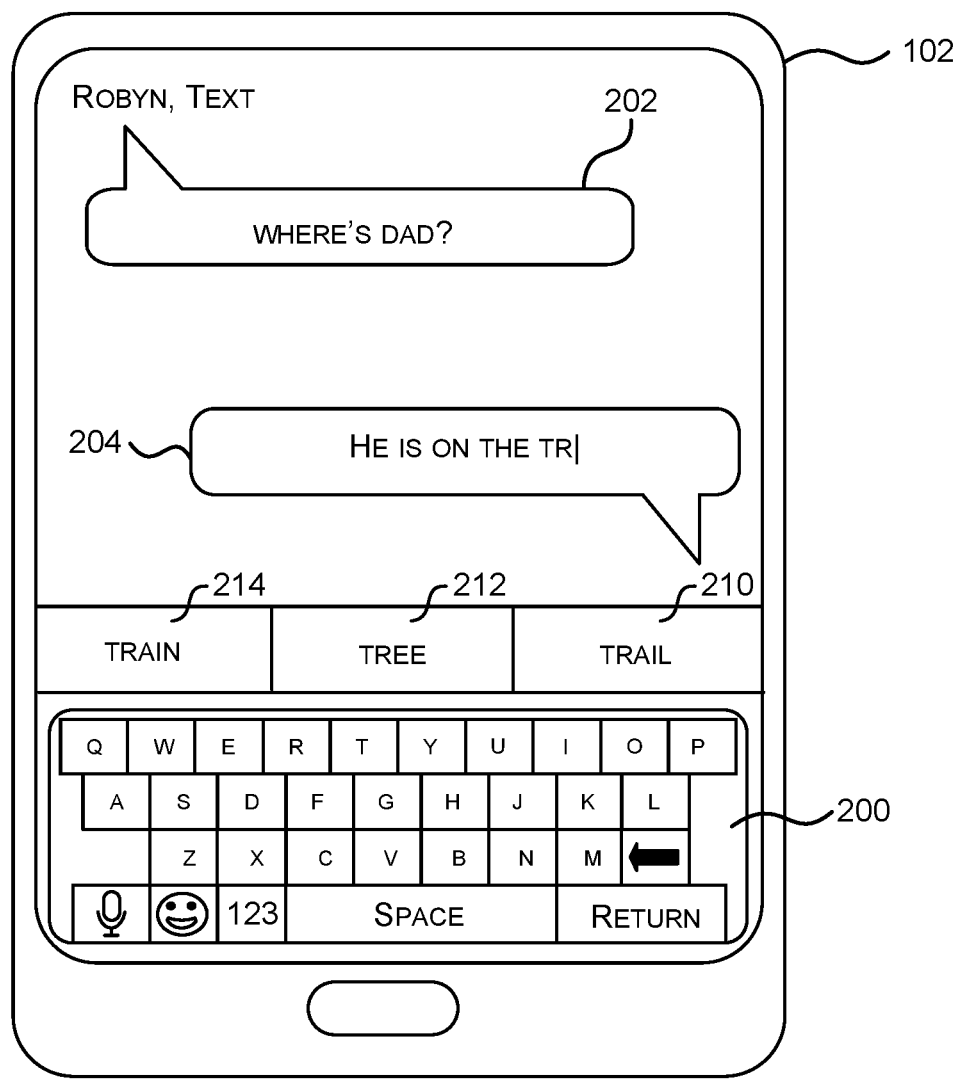
FIG. 2A is a schematic diagram of a smart phone having a predictive virtual keyboard.

FIG. 2A is a schematic diagram of a smart phone such as smart phone 102 having a predictive virtual keyboard 200. A short messaging service (SMS) application is executing on the smart phone 102 and a user of the smart phone has received an SMS message 202 which says "WHERE'S DAD?". The user of the smart phone 102 is in the process of typing in a reply and so far has input "HE IS ON THE TR". The user input is provided to the language model 110 which computes predicted next items and three of these are offered as candidates as part of the virtual keyboard. In the example of FIG. 2 there are three candidate prediction keys that are part of the virtual keyboard, each displaying one candidate. In this example the candidates are "train" 214, "tree" 212 and "trail" 210. Suppose the true word that the user wants to input next is "team". The user does not find "team" offered as a candidate in FIG. 2A and so the user continues to make user input and enters the letter "a" next as indicated in user input entry field 206 of FIG. 2A. The language model 110 receives the user input from field 206 and recomputes predicted next items. Three candidates are offered and these are "train" 214, "tram" 216 and "trail" 210. The user still does not find "team" as a candidate and so continues to make user input, perhaps by deleting "ra" and entering "e". This is time consuming and complex for the end user.

Figure 2B:
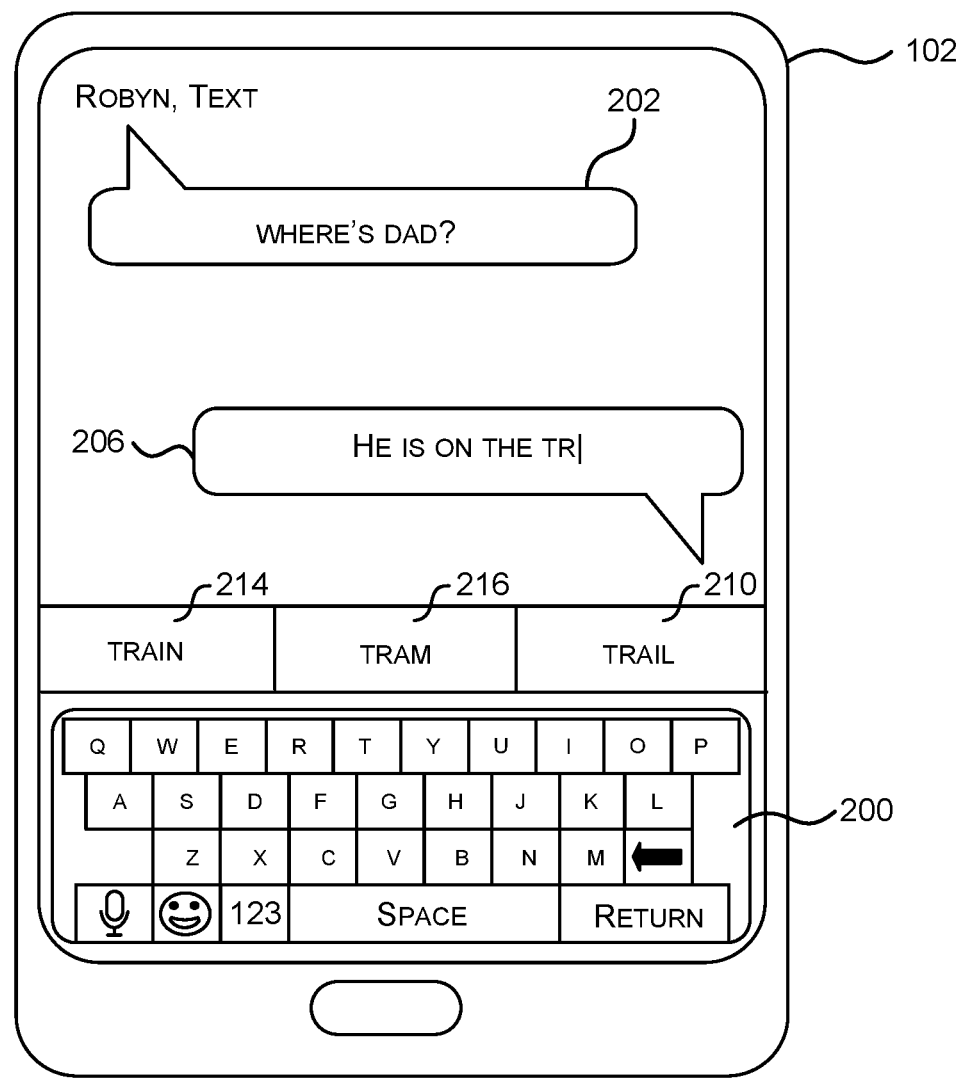
FIG. 2B is a schematic diagram of the smart phone of FIG. 2A when re-ranking of candidates has occurred.
Figure 2C:
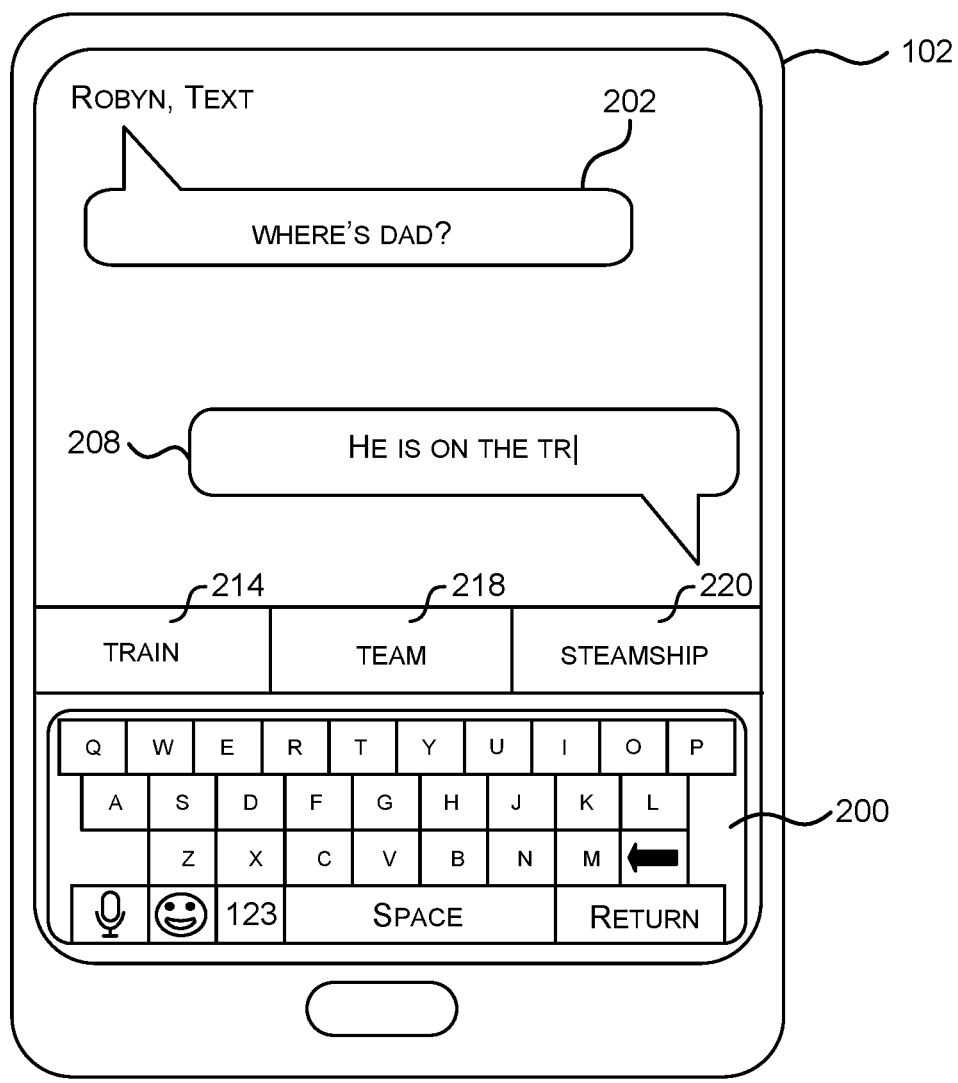
FIG. 2C is a schematic diagram of the smart phone of FIG. 2B when re-ranking of candidates has occurred

The present embodiments enable the language model to compute better candidates. Consider the situation of FIG. 2A again. It is known that the user is operating a virtual keyboard 200 with a QWERTY layout. Therefore the user may have intended to enter "e" rather than "r" since these are adjacent in the QWERTY layout. By training the language model 110 to take into account alternative candidates for "team" which are computed taking into account human error on a QWERTY keyboard, the language model 110 is better able to discriminate between "tram" and "team" and between "trail" and "steamship". Therefore the language model offers candidates as indicated in FIG. 2C which are "train" 214, "team" 218 and "steamship" 220 and which include the true item "team" that the user wants to enter. The user selects "team" by touching the key 218 or by touching the space bar of the virtual keyboard. In this way user input burden is significantly reduced.

The example described with reference to FIGS. 2A, 2B and 2C involves human error being considered when generating the alternative candidates. However, other sources of error may also be considered such as noise, corruption and others as mentioned above.

Figure 3:
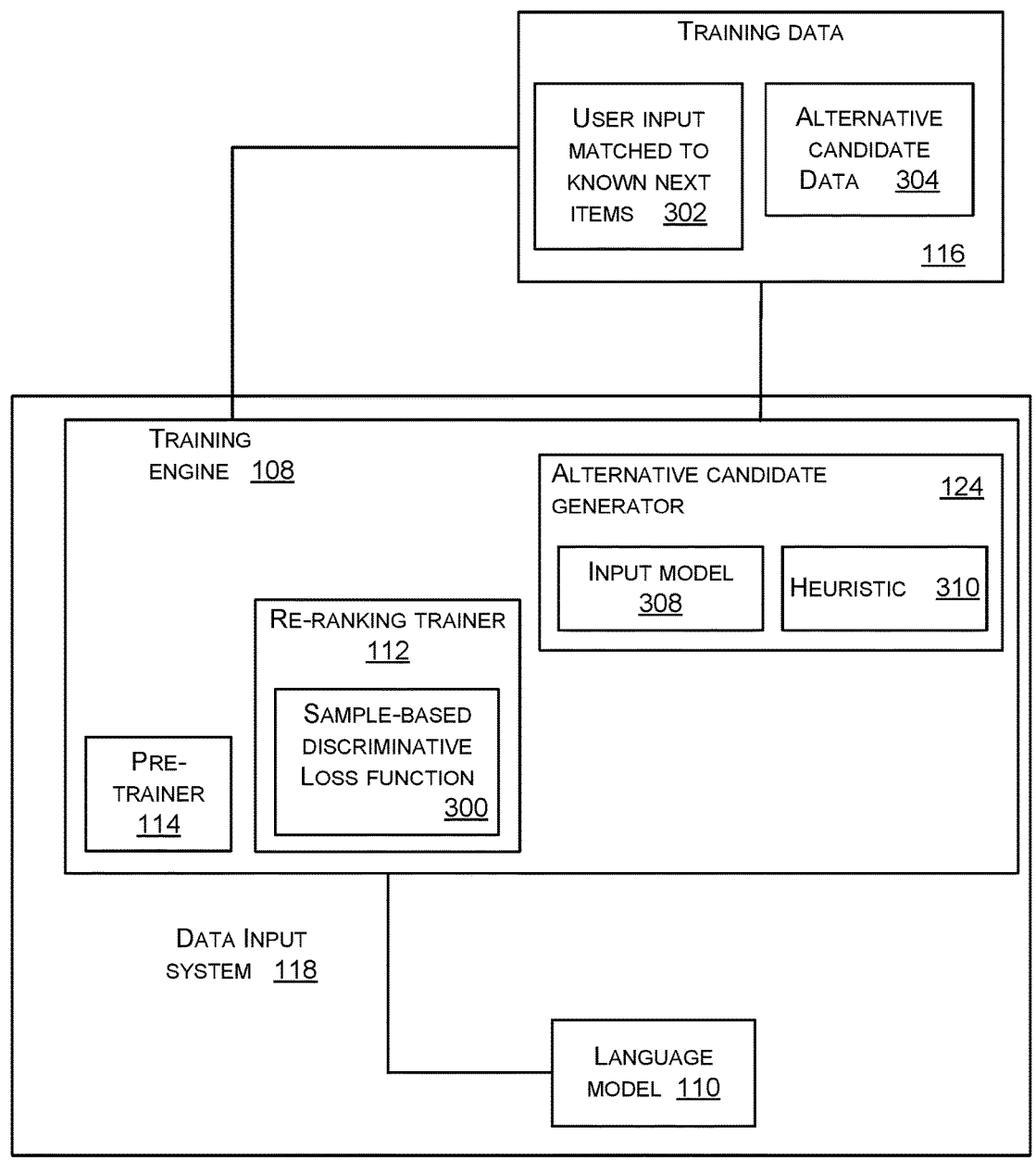
FIG. 3 is a schematic diagram of the data input system of FIG. 1 in more detail.

FIG. 3 is a schematic diagram of the data input system 118 with language model 110 in more detail. There is a training engine 108 as described with reference to FIG. 1 which has a pre-trainer 114 and a re-ranking trainer 112. In some examples the re-ranking trainer 112 has a sample-based discriminative loss function 300 although this is not essential. A sample-based discriminative loss function is a description of a relationship between parameters of the language model 110 and ability of the language model to tell the difference between a true item (that the user wants to input) and a plurality of items selected from a vocabulary of the language model. The well known noise-contrastive estimation training procedure (described in more detail with reference to FIG. 5) is an example of a training procedure that uses a sample-based discriminative loss function.

An alternative candidate generator 124 has an input model 308 and one or more heuristics 310. Either or both of the input model 308 and heuristics 310 are used to generate data 304 about alternative candidates of true items that arise as a result of imperfections in user input.

The training data 116 comprises examples of user input matched to known next items 302 (that is true items and corresponding user input), and the training data 116 comprises alternative candidate data 304. More detail about the alternative candidate data is now given with reference to FIG. 4.

Alternatively, or in addition, the functionality of the components of FIG. 3 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 4A:
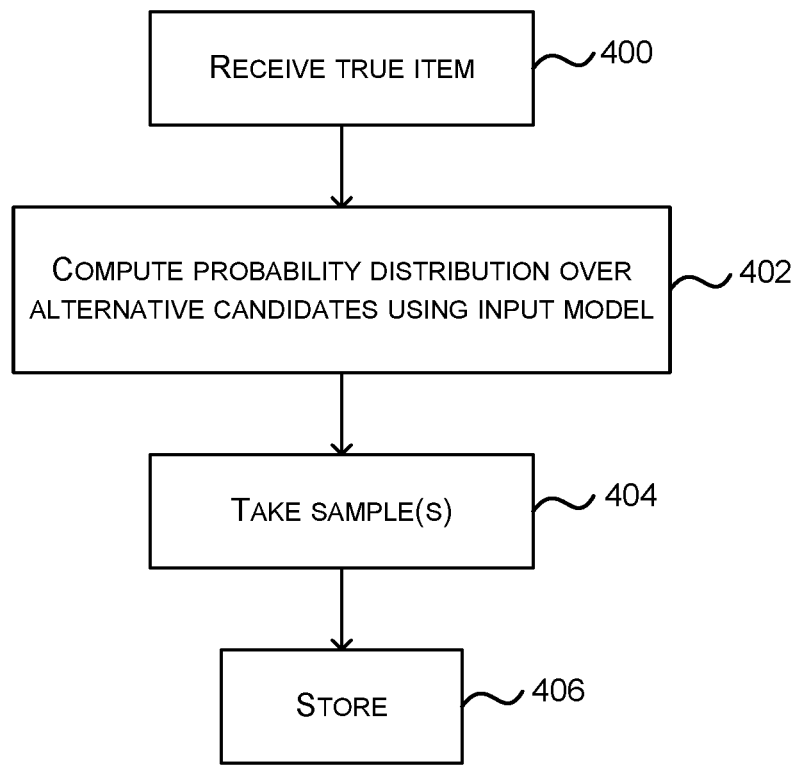
FIG. 4A is a flow diagram of a method at the alternative candidate generator of FIG. 3.

FIG. 4a is a method at the alternative candidate generator 124. A true word is received 400 for which it is desired to compute alternative candidate data. An input model (308 of FIG. 3) is accessed which generates user input given a true word. The input model is used to compute a probability distribution over alternative candidates. Samples 404 are taken from the probability distribution at random and stored 406 and these samples are alternative candidates optionally with associated probabilities.

In an example the input model is:

$$P_{input}(\text{user input} | \text{true item})$$

Which means that the input model generates the probability of an observed user input, given the true item (such as a word or emoji) the user was trying to input. The input model is domain-specific in some cases such as being for typing user input on a virtual keyboard, or for speech input on a speech interface. The input model may take into account the layout of any keyboard involved. It may take into account information about particular sensors used or types or model of electronic device. The observed user input may be a mis-spelled or redacted or mis-typed version of the true item. In some cases the observed user input comprises one or more coordinates of user input events associated with a touch screen or augmented reality display. In some cases the observed user input comprises handwriting or a speech audio signal or speech audio features.

In an example the input model is a process which when given a true word, generates an alternative candidate by replacing each character of the true word by a character chosen at random from the set of characters present on a standard QWERTY keyboard. This is one example of an input model and is not intended to limit the scope of the technology. The input model is any process which when given a true word generates an alternative candidate. The input model optionally computes a probability of generating the alternative candidate. Preferably the input model takes into account the domain of user input. In some cases the input model is user specific in that it takes into account user input behavior of a particular user. In some cases the input model is specific to a group of users, such as left handed users, or speakers with a particular accent.

By applying Bayes rule to the input model it is possible to compute predictions of the true word $$P(\text{predicted word} | \text{user input}) = \frac{P_{input}(\text{user input} | \text{predicted word}) P(\text{predicted word})}{\sum_{\text{predicted word}} P_{input}(\text{user input} | \text{predicted word}) P(\text{predicted word})}$$

The above equation is expressed in words as the probability of a particular alternative candidate given particular user input is equal to the probability of the user input given the candidate times the prior probability of the candidate, divided by the sum over all alternative candidates of the probability of an alternative candidate given the user input times the prior probability of the alternative candidate.

Where the prior probability P(predicted word) is estimated based on the frequency of each item in the training data or in other ways.

The above equation is for the case where context items are not taken into account. In order to take context items into account the prior probability P(predicted word) is replaced by a conditional probability P(predicted word|context) which is estimated based on ngram frequencies in the training data or in other ways.

Given the above equation, the probability of a word being predicted given a noisy observation of that true word is computed as:

$$P(\text{predicted item} | \text{true item}) = \sum_{\text{user input}} P(\text{predicted item} | \text{user input}) P_{input}(\text{user input} | \text{true item})$$

Which is expressed in words as the probability of an alternative candidate being predicted given a true item is equal to the sum over possible user inputs of the probability of the alternative candidate given the user input times the probability of the user input given the true item.

An unbiased estimate of P(predicted item|true item) is obtained by independently sampling N different user inputs $w_1, \ldots w_N$ from $P_{input}(w_i|\text{true item})$ and estimating it as:

$$\frac{1}{N} \sum_{n=1}^{N} p(\text{predicted word} | w_n)$$

The above expression means that an unbiased estimate of the probability of an alternative candidate being predicted given a true word is given by computing an average of the probabilities of the alternative candidate over N values of the user input obtained by taking N independent samples from the input model.

Where N is set to 1 a single user input is sampled for each true word. When N is larger than 1, N independent samples are to be drawn from the distribution input model. This is done by independently sampling user inputs $w_1$ to $w_N$ and then independently sampling each $P_i$ from the input model.

Figure 4B:
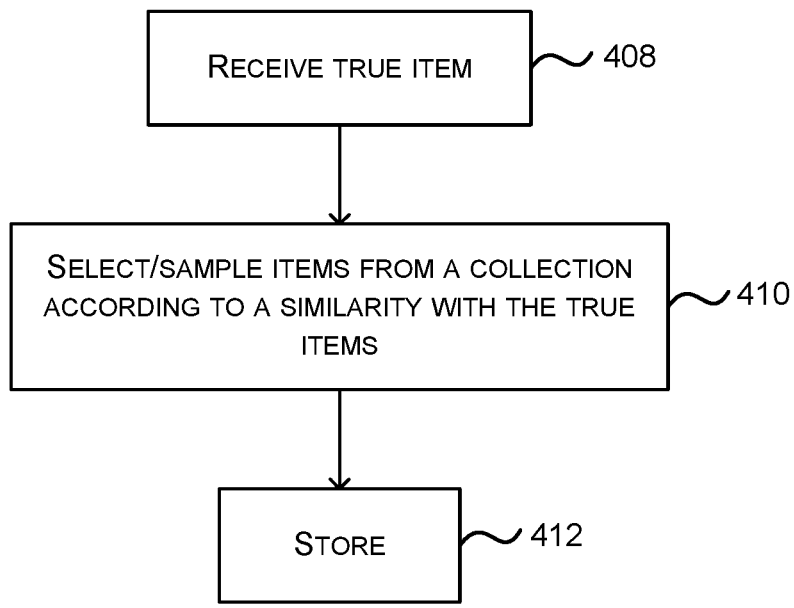
FIG. 4B is a flow diagram of another method at the alternative candidate generator of FIG. 3.

In the case that one or more heuristics are used rather than a user input model 308 the method of FIG. 4B applies. Here a true item is received 408 for which it is desired to compute alternative candidate items. A collection of items is available, such as a vocabulary of words used by the language model, or a list of morphemes used by the language model, or a plurality of emoji used by the language model, or a plurality of pictograms used by the language model. The alternative candidate generator randomly selects or samples 410 items from the collection according to similarity with the true item. The selected items are stored 412 and are alternative candidates. The measure of similarity is a distance in a feature space of the items in some cases. In some cases the measure of similarity is a string metric for measuring the difference between two strings. In an example the measure of similarity is a Levenshtein edit distance from the true item, where the items are words. A Levenshtein edit distance is a minimum number of single character edits to change one text item into another. The Levenshtein edit distance is interpolated with an empirical distribution over words in some cases. In the case that the items are speech items the similarity is a Levenshtein edit distance interpolated with a uniform distribution over all words in a fixed vocabulary with the same Soundex representation as the true word. A Soundex representation is a representation of spoken text items by sound as pronounced in a spoken language and so that text items which sound the same when spoken in the language have a similar representation.

Figure 5:
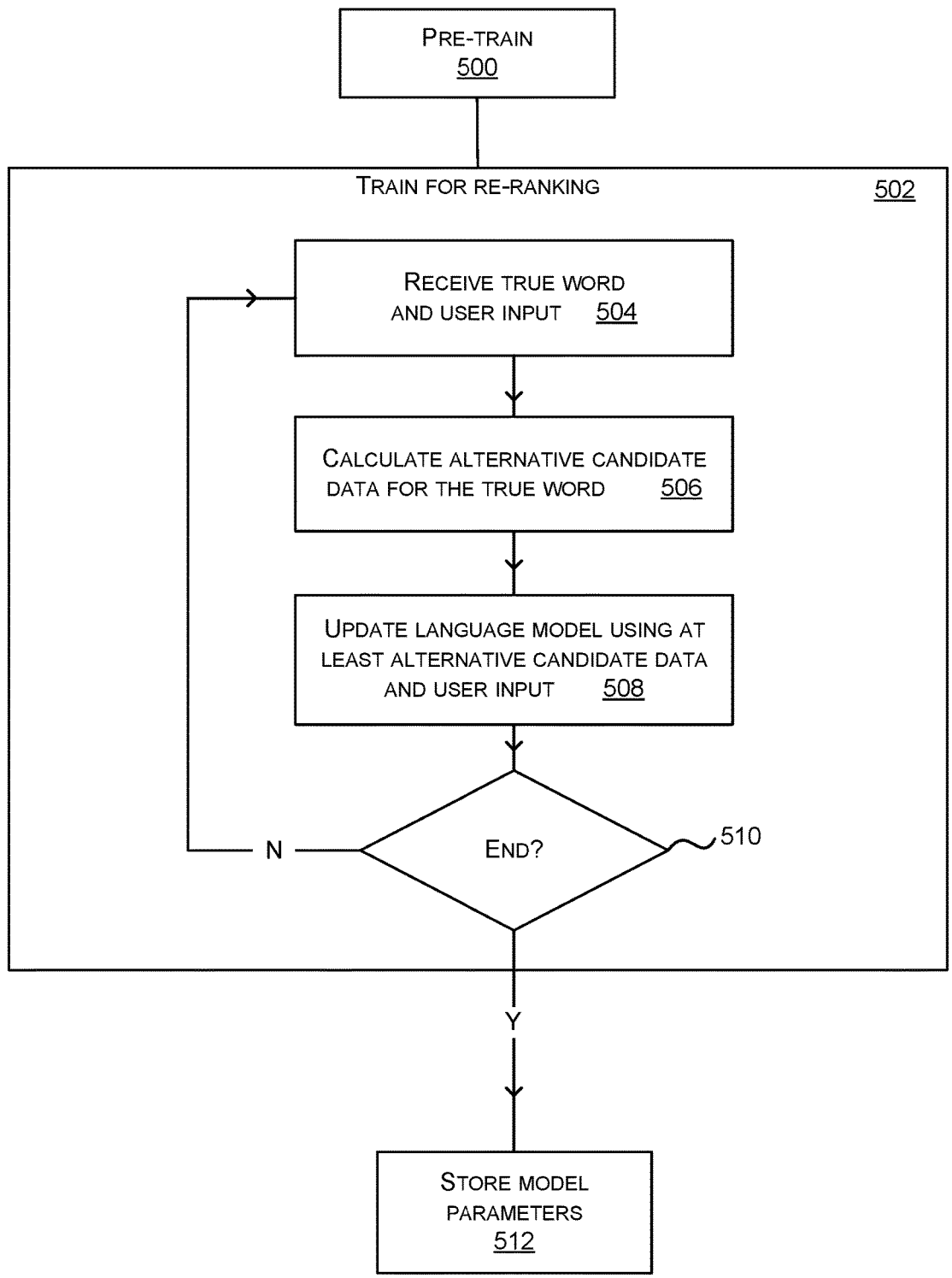
FIG. 5 is a flow diagram of a method of training a language model.

FIG. 5 is a flow diagram of a method at the training engine 108. The training engine optionally pre-trains 500 the language model 110 using training data comprising pairs of user input and known next text items. The training data is obtained by empirically observing user input and/or by obtaining sequences of language items from one or more sources such as a corpus of documents or a collection of audio recordings of speech. The pre-training enables the language model 110 to reach a good working level of performance in an efficient manner using standard training methods appropriate to the particular type of language model being used. For example, the pre-training method uses a full softmax loss. Alternatively, the pre-training method also uses a sample based loss with a simpler fixed noise distribution such as unigram frequency. The language model 110 is then further trained 502 for the particular scenario of re-ranking candidates. However, it is not essential to use the pre-training process 500 as the language model 110 is trained from scratch using the training for re-ranking process 502 of FIG. 5 in some cases.

The re-ranking trainer 112 receives an item of training data comprising user input and a corresponding true word. The alternative candidate generator 124 computes alternative candidate data for the true word 506. For example, using an input model as described with reference to FIG. 4A a plurality of samples are drawn to give alternative candidate words and associated probabilities. The language model 110 is then updated 508 using at least the alternative candidate data and the user input. Various different ways of updating 508 using at least the alternative candidate data and the user input are possible and these are explained with reference to FIG. 6.

The training process 502 checks whether to end at check point 510, for example, by checking if all the training data has been used or whether convergence has been reached. If the training process is to repeat it returns to operation 504. If the training process ends the model parameters are stored 512.

Figure 6:
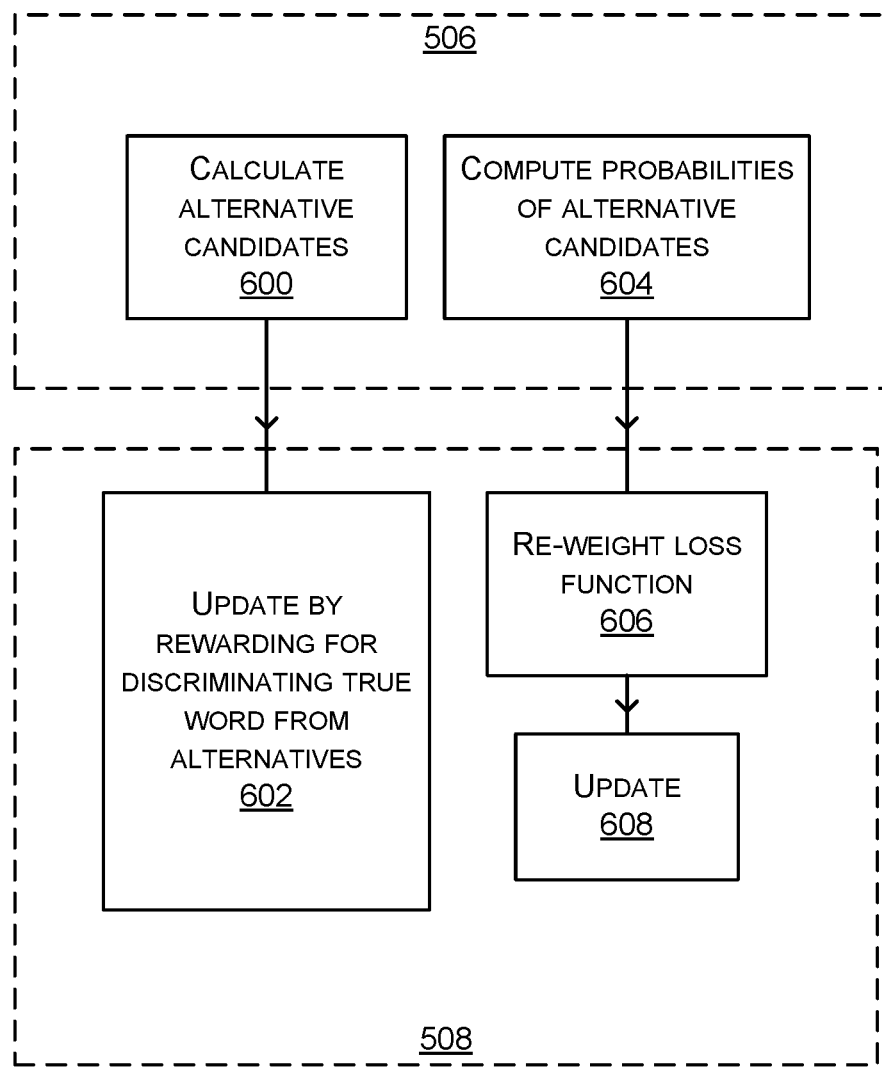
FIG. 6 is a flow diagram of part of the method of FIG. 5 in more detail.

FIG. 6 has more detail about examples of operations 506 and 508 of FIG. 5 with respect to neural network language model 110 In a first example, the alternative candidate generator has calculated 600 a plurality of alternative candidates of the true item using any of the methods described with reference to FIGS. 4A and 4B. The neural network language model 110 is updated by rewarding its ability to discriminate the true item from the calculated alternatives. This is achieved by using a sample-based discriminative loss function 300 as part of the training procedure. As mentioned above a sample-based discriminative loss function is a description of a relationship between parameters of the language model 110 and ability of the language model to tell the difference between a true item (that the user wants to input) and a plurality of other items (referred to as noise items) selected from a vocabulary of the language model or another source. A non-exhaustive list of examples of training procedures which use a sample-based discriminative loss function is: noise-contrastive estimation, importance sampling, negative sampling, sampled logistic, sampled softmax.

The well known noise-contrastive estimation training procedure is described in detail in "Fast and simple algorithm for training neural probabilistic language models" Andiry Mnih and Yee Whye The, 2012, Proceedings of the 12$^{th}$ International Conference on Machine Learning. The noise-contrastive estimation procedure comprises sampling a plurality of noise items from a noise distribution (which may be different for each true item) and rewarding the language model for discriminating only between the true item and the sampled noise items. In the case of processes 600 and 602 of FIG. 6 the noise items are the calculated alternative candidates. In this way process 602 is able to reward the language model for discriminating between the true word and the calculated alternative candidates.

Where a sample-based discriminative loss function is used the loss function is searched using stochastic gradient descent or any other suitable optimization process. The solution found is used to update the parameters of the language model. Fresh noise items are computed for each target item (item to be predicted).

In another example, the training engine 108 uses a loss function which is a full softmax or a spherical loss function. In this case, scores or probabilities of alternative candidate items are computed 604 by the alternative candidate generator using the methods of FIG. 4A or 4B. These are used by the training engine to re-weight the loss function in order to place more emphasis on discrimination between the true item and one or more of the alternative candidates according to the probability of those alternative candidates.

Figure 7:
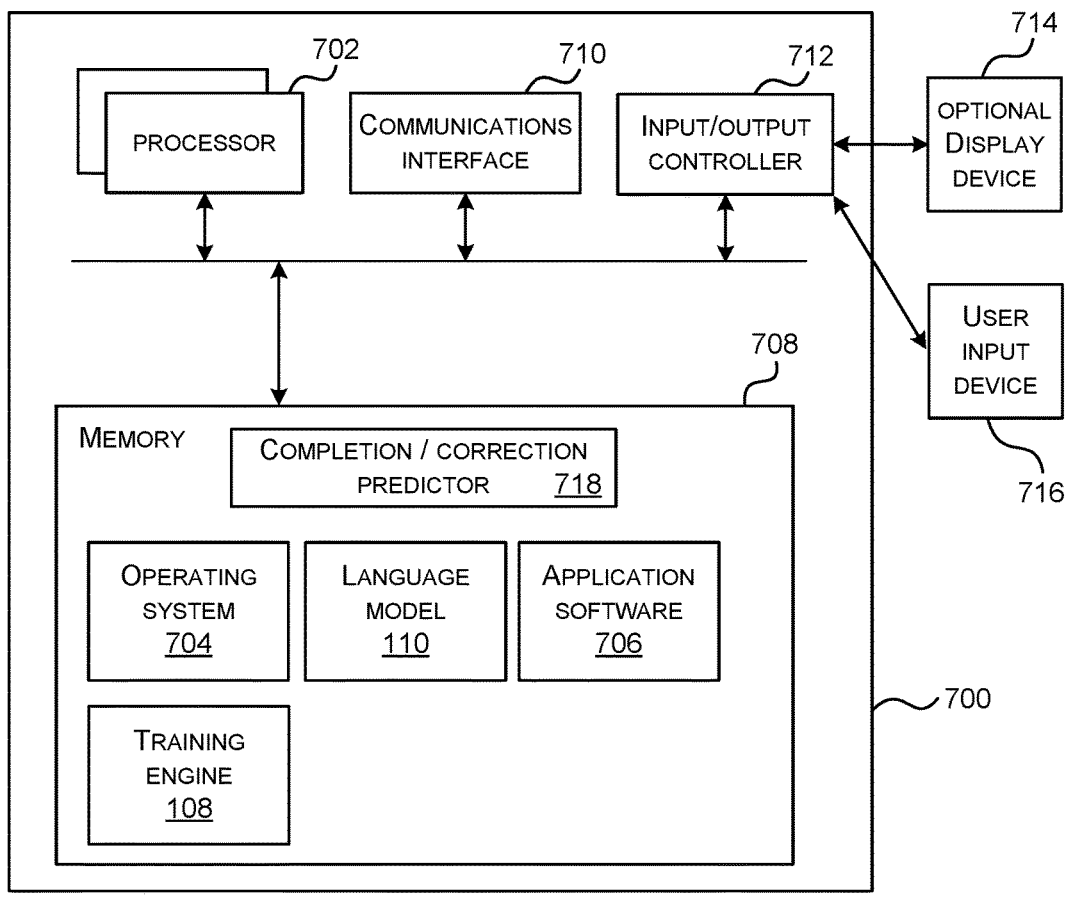
FIG. 7 illustrates an exemplary computing-based device in which embodiments of a data input system are implemented.

FIG. 7 illustrates various components of an exemplary computing-based device 700 which are implemented as any form of a computing and/or electronic device, and in which embodiments of a data input system (118 of FIG. 1) are implemented in some examples.

Computing-based device 700 comprises one or more processors 702 which are microprocessors, controllers or any other suitable type of processors for processing computer executable instructions to control the operation of the device in order to facilitate data input and/or to train a language model to predict candidates for data input by a user. In some examples, for example where a system on a chip architecture is used, the processors 702 include one or more fixed function blocks (also referred to as accelerators) which implement a part of the method of any of FIGS. 4A, 4B, 5, 6 in hardware (rather than software or firmware). Platform software comprising an operating system 704 or any other suitable platform software is provided at the computing-based device to enable application software 706 to be executed on the device such as a short messaging service application, speech recognition application, text authoring application or other application. A training engine 108 at the computing-based device trains a language model 110 by updating parameters of the language model using a training algorithm that takes into account alternative candidates for items. A completion/correction predictor 718 uses predictions computed by the language model 110 to complete and/or correct data being input to the computing-based device 700 or another device in communication with the computing-based device 700, for example, using communications interface 710. The communications interface 710 is a network card, a transceiver or any other communications interface.

The computer executable instructions are provided using any computer-readable media that is accessible by computing based device 700. Computer-readable media includes, for example, computer storage media such as memory 708 and communications media. Computer storage media, such as memory 708, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 708) is shown within the computing-based device 700 it will be appreciated that the storage is, in some examples, distributed or located remotely and accessed via a network or other communication link (e.g. using communication interface 710).

The computing-based device 700 also comprises an input/output controller 712 arranged to output display information to a display device 714 which may be separate from or integral to the computing-based device 700. The display information may provide a graphical user interface. The input/output controller 712 is also arranged to receive and process input from one or more devices, such as a user input device 716 (e.g. a mouse, keyboard, camera, microphone or other sensor). In some examples the user input device 716 detects voice input, user gestures or other user actions and provides a natural user interface (NUI). This user input may be used to compute candidate next items for input to an electronic device, to specify training algorithms to be used by the training engine, to specify training data to be used and for other purposes. In an embodiment the display device 714 also acts as the user input device 716 if it is a touch sensitive display device. The input/output controller 712 outputs data to devices other than the display device in some examples, e.g. a locally connected printing device.

Any of the input/output controller 712, display device 714 and the user input device 716 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A data input system comprising:
a processor which receives user input comprising a sequence of one or more items;
a language model which computes candidate next items in the sequence using the user input;
a training engine which trains the language model using data about a plurality of true words which a user intended to input using the data input system, and for each true word, at least one alternative candidate for the true word, being a word computed assuming imperfect entry of the true word to the data input system.

The data input system described above wherein imperfect entry of the true word to the data input system comprises one or more of: a corrupted entry of the true word, a partial entry of the true word, an ambiguous entry of the true word, an entry of the true word comprising noise.

The data input system described above wherein the language model is configured to recompute the candidate next items in response to the processor receiving additional user input comprising information about the sequence of one or more items.

The data input system described above wherein the training engine optimizes a loss function and wherein the loss function comprises information about the alternative candidates.

The data input system described above wherein the training engine uses a sample-based discriminative loss function to train the language model.

The data input system described above wherein the language model is a neural network language model which takes any of the following features as input: characters, words, n-grams.

The data input system described above comprising an alternative candidate generator configured to compute the information about the at least one alternative candidate, the alternative candidate generator comprising an input model which generates the probability of an observed user input, given a true item.

The data input system described above wherein the input model is specific to any one or more of: speech user input, text user input, a keyboard layout, a type of electronic device, a user, a group of users.

The data input system described above wherein the alternative candidate generator is configured to compute a probability distribution over alternative candidates using the input model.

The data input system of described above wherein the training engine is configured to use samples from the probability distribution over alternative candidates as noise samples in a noise contrastive estimation training procedure.

The data input system described above comprising an alternative candidate generator configured to compute alternative candidates by computing a similarity metric between the true item and items in a collection of items.

The data input system described above wherein the similarity metric is a string metric for measuring the difference between two strings.

The data input system described above wherein the similarity metric is a minimum number of single character edits to change one text item into another, interpolated with an empirical distribution over text items.

The data input system described above wherein the similarity metric is a minimum number of single character edits to change one text item into another, interpolated with a uniform distribution over all text items in a fixed vocabulary with the same spoken text representation as the true item, where the spoken text representation represents spoken text items by sound as pronounced in a spoken language so that text items which sound the same when spoken in the language have a similar representation.

The data input system described above wherein the training engine optimizes a loss function after having re-weighted the loss function using information about the alternative candidates.

A computer-implemented method comprising:
receiving, at a processor, user input comprising a sequence of one or more items;
computing, using a language model, candidate next items in the sequence using the user input;
training the language model using data about a plurality of true words which a user intended to input using the data input system, and for each true word, at least one alternative candidate for the true word, being a word computed assuming imperfect entry of the true word to the data input system.

The method described above comprising training the language model using noise contrastive estimation where the noise samples are computed as alternative candidates of true words assuming imperfect entry of the true words to the electronic device.

The method described above comprising using the language model to recompute the candidate next items in response to the processor receiving additional user input comprising information about the sequence of one or more items.

The method described above comprising computing the information about the at least one alternative candidate using an input model which generates the probability of an observed user input, given a true item and where the input model is specific to any one or more of: speech user input, text user input, a keyboard layout, a type of electronic device, a user, a group of users.

An electronic device comprising:
a processor which receives user input comprising a sequence of one or more items;
a language model which computes candidate next items in the sequence using the user input;
the language model having been trained using data about a plurality of true words which a user intended to input using the data input system, and for each true word, at least one alternative candidate for the true word, being a word computed assuming imperfect entry of the true word to the data input system.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A data input system comprising:
a processor;
a language model implemented using the processor, which computes candidate next items in an input sequence of one or more items;
a training engine implemented using the processor which performs training of the language model using training data comprising a plurality of true words and at least one alternative candidate word for each of the plurality of true words,
wherein the plurality of true words comprises respective words intended to be input with a virtual keyboard,
wherein the at least one alternative candidate word for each true word comprises at least one word received from imperfect entry during attempted input of the true word with the virtual keyboard, and
wherein, as a result of the training, the language model is trained to reward discriminating between the plurality of true words and the at least one alternative candidate word for each of the plurality of true words.

2. The data input system of claim 1 wherein imperfect entry of the at least one word to the data input system comprises one or more of:
a corrupted entry of the at least one word, a partial entry of the at least one word, an ambiguous entry of the at least one word, an entry of the at least one word comprising noise.

3. The data input system of claim 1 wherein the language model is configured to recompute the candidate next items in response to the processor receiving additional user input comprising information about the input sequence of one or more items.

4. The data input system of claim 1 wherein the training engine optimizes a loss function and wherein the loss function comprises information about the alternative candidates.

5. The data input system of claim 1 wherein the training engine uses a sample-based discriminative loss function to train the language model.

6. The data input system of claim 1 wherein the language model is a neural network language model which takes any of the following features as input: characters, words, n-grams.

7. The data input system of claim 1 comprising an alternative candidate generator configured to compute information about the at least one alternative candidate, the alternative candidate generator comprising an input model which generates the probability of an observed user input, given a true word.

8. The data input system of claim 7 wherein the input model is specific to any one or more of:
speech user input, text user input, a keyboard layout, a type of electronic device, a user, a group of users.

9. The data input system of claim 7 wherein the alternative candidate generator is configured to compute a probability distribution over alternative candidates using the input model.

10. The data input system of claim 9 wherein the training engine is configured to use samples from the probability distribution over alternative candidates as noise samples in a noise contrastive estimation training procedure.

11. The data input system of claim 1 comprising an alternative candidate generator implemented using the processor, the alternative candidate generator configured to compute alternative candidates by computing a similarity metric between a respective true word and items in a collection of items.

12. The data input system of claim 11 wherein the similarity metric is a string metric for measuring the difference between two strings.

13. The data input system of claim 11 wherein the similarity metric is a minimum number of single character edits to change one text item into another, interpolated with an empirical distribution over text items.

14. The data input system of claim 11 wherein the similarity metric is a minimum number of single character edits to change one text item into another, interpolated with a uniform distribution over all text items in a fixed vocabulary with the same spoken text representation as the respective true word, where the spoken text representation represents spoken text items by sound as pronounced in a spoken language so that text items which sound the same when spoken in the language have a similar representation.

15. The data input system of claim 1 wherein the training engine optimizes a loss function after having re-weighted the loss function using information about the alternative candidates.

16. A computer-implemented method performed by an electronic device, the method comprising:
receiving, at a processor, user input comprising a sequence of one or more items;
computing, using a language model, candidate next items in the sequence of one or more items;
training the language model using training data comprising a plurality of true words and at least one alternative candidate word for each of the plurality of true words,
wherein the plurality of true words comprises respective words intended to be input with a virtual keyboard,
wherein the at least one alternative candidate word for each true word comprises at least one word received from imperfect entry during attempted input of the true word with the virtual keyboard, and
wherein, as a result of the training, the language model is trained to reward discriminating between the plurality of true words and the at least one alternative candidate word for each of the plurality of true words.

17. The method of claim 16 comprising training the language model using noise contrastive estimation where the noise samples are computed as alternative candidates of true words assuming imperfect entry of the true words to the electronic device.

18. The method of claim 16 comprising using the language model to recompute the candidate next items in response to the processor receiving additional user input comprising information about the sequence of one or more items.

19. The method of claim 16 comprising computing information about the at least one alternative candidate using an input model which generates the probability of an observed user input, given a true item and where the input model is specific to any one or more of:
speech user input, text user input, a keyboard layout, a type of electronic device, a user, a group of users.

20. An electronic device comprising:
a processor which receives user input from a virtual keyboard, the user input comprising a sequence of one or more items;

a language model, implemented using the processor, which computes candidate next items in the sequence using the user input;

the language model having been trained using training data comprising a plurality of true words and at least one alternative candidate word for each of the plurality of true words, wherein the plurality of true words comprises respective words intended to be input with the virtual keyboard, wherein the at least one alternative candidate word for each true word comprises at least one word received from imperfect entry during attempted input of the true word with the virtual keyboard, and wherein the language model is trained to reward discriminating between the plurality of true words and the at least one alternative candidate word for each of the plurality of true words.

* * * * *